United States Patent
Homan et al.

(10) Patent No.: US 6,233,317 B1
(45) Date of Patent: *May 15, 2001

(54) MULTIPLE LANGUAGE ELECTRONIC MAIL NOTIFICATION OF RECEIVED VOICE AND/OR FAX MESSAGES

(75) Inventors: John L. Homan, Ephrata; Merline T. Cherian, West Chester; Sandra A. Howat Haftl, Westtown, all of PA (US)

(73) Assignee: Unisys Corporation, Blue Bell, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/987,571

(22) Filed: Dec. 11, 1997

(51) Int. Cl.[7] .............................. H04M 1/64; H04M 11/00
(52) U.S. Cl. ............... 379/88.05; 379/67.1; 379/88.06; 379/100.13; 379/93.24
(58) Field of Search ............................... 379/67.1, 88.05, 379/88.06, 88.12, 88.13, 88.14, 88.15, 88.17, 88.18, 88.22, 93.24, 93.09, 100.08, 100.13; 707/100, 104, 200; 345/327; 348/10–13; 395/200.31, 200.42

(56) References Cited

U.S. PATENT DOCUMENTS

| | | | |
|---|---|---|---|
| 4,615,002 | 9/1986 | Innes | 364/200 |
| 4,870,402 | 9/1989 | DeLuca et al. | 340/825.44 |
| 5,307,265 | 4/1994 | Winans | 364/419.01 |
| 5,412,712 | 5/1995 | Jennings | 379/88 |
| 5,434,776 | 7/1995 | Jain | 364/419.1 |
| 5,493,692 | 2/1996 | Theimer et al. | 455/26.1 |
| 5,509,060 * | 4/1996 | Hall et al. | 379/207 |
| 5,524,137 * | 6/1996 | Rhee | 379/67 |
| 5,568,383 | 10/1996 | Johnson et al. | 364/419.02 |
| 5,586,037 * | 12/1996 | Gil et al. | 364/464.03 |
| 5,634,005 * | 5/1997 | Matsuo | 395/200.02 |
| 5,635,918 * | 6/1997 | Tett | 340/825.52 |
| 5,675,507 * | 10/1997 | Bobo, II | 364/514 R |
| 5,675,817 | 10/1997 | Moughanni et al. | 395/753 |
| 5,692,125 * | 11/1997 | Schloss et al. | 395/209 |
| 5,742,905 * | 4/1998 | Pepe et al. | 455/461 |
| 5,754,939 * | 5/1998 | Herz et al. | 455/4.2 |
| 5,835,087 * | 11/1998 | Herz et al. | 345/327 |
| 5,862,223 * | 1/1999 | Walker et al. | 380/25 |
| 5,862,325 * | 1/1999 | Reed et al. | 395/200.31 |
| 5,875,422 * | 2/1999 | Eslambolchi et al. | 704/3 |
| 5,884,246 * | 3/1999 | Boucher et al. | 704/2 |
| 5,953,392 * | 9/1999 | Rhie et al. | 379/88.13 |
| 5,974,413 * | 10/1999 | Beauregard et al. | 707/6 |
| 5,984,178 * | 11/1999 | Gill et al. | 235/379 |
| 6,026,410 * | 2/2000 | Allen et al. | 707/104 |

OTHER PUBLICATIONS

Press release, Apr. 28, 1997, Brett Oliver Quicktek Releases a Software Agent Language called Whisper'O The First Language using the Java Runtime Engine

* cited by examiner

Primary Examiner—Fan Tsang
Assistant Examiner—Allan Hoosain
(74) Attorney, Agent, or Firm—Lise A. Rode; Mark T. Starr; Woodcock Washburn Kurtz Mackiewicz & Norris

(57) ABSTRACT

In a messaging system of the type that receives a voice and/or fax message intended for a subscriber, an electronic mail message notifying the subscriber of the received message is composed in a language selected by the subscriber and then sent to one or more subscriber supplied electronic mail addresses. The subscriber can select to receive such notification messages in any one of a plurality of different languages that are available on the system. Different subscribers can select different ones of the available languages.

14 Claims, 3 Drawing Sheets

MULTIPLE LANGUAGE ELECTRONIC MAIL NOTIFICATION OF RECEIVED VOICE AND/OR FAX MESSAGES

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention relates to messaging systems of the type that receive voice and/or fax messages intended for a subscriber and that store the messages for later retrieval by the subscriber. More particularly, the present invention is directed to methods and apparatus for notifying a subscriber of such a system, via an e-mail message generated in a subscriber selected language, that the subscriber has received a new voice and/or fax message on the system.

2. Description of the Prior Art

Messaging systems of the type that receive voice and/or fax messages and that store the messages for later retrieval by subscribers are known. Unisys Corporation, assignee of the present invention, provides such a system in the form of its Universal Voice Message System ("UVMS"), which is a network application that executes on the Unisys Network Applications Platform ("the NAP system"). The NAP system is a configuration of hardware and software that provides data and voice processing capabilities through applications, such as UVMS, running on a host computer. The NAP system provides the interface between these applications, called network applications, and a telephone network. Presently, the NAP system is implemented on UNISYS A Series and ClearPath HMP computer systems running the MCP operating system. Detailed descriptions of the NAP system and the means for developing network applications, such as UVMS, to run on the NAP system can be found in U.S. Pat. Nos. 5,133,004, 5,323,450, 5,384,829, and 5,493,606, as well as in co-pending, commonly assigned applications Ser. No. 08/944,924, filed Oct. 6, 1997, entitled "Enhanced Multi-Lingual Prompt Management In A Voice Messaging System With Support For Speech Recognition," and Ser. No. 08/964,744, filed Nov. 5, 1997, entitled "Methods And Apparatus For Providing External Access To Executable Call Flows Of A Network Application". Each one of these patents and pending applications is hereby incorporated by reference in its entirety.

A network application, like UVMS, comprises one or more call flows that determine the functionality of the application. A call flow defines how a call is processed from the time it is connected until it is disconnected. It determines how the network application will react to various telephony-related events. In particular, a call flow specifies each function or processing step to be executed during a telephone call, the possible results for each function, the decision path to be followed based on the result, and each voice prompt to be played during the course of the telephone call. Certain call flows also interact with a subscriber to allow the subscriber to set certain user-defined parameters and to enable certain features of the network application.

UVMS is a voice/fax messaging system in which subscribers are each assigned a unique mailbox in which received voice and/or fax messages are stored for later retrieval and playback. A system administrator controls the system features that a subscriber is able to use through a mechanism know as a class of service(COS). COSs are sets of features assigned to different mailboxes. COSs are created and assigned to subscribers by the system administrator and enable the administrator to control the subscribers' use of UVMS features. One group of features that can be "enabled" in a given COS relate to the manner in which a subscriber can be informed of the receipt of a voice and/or fax message. For example, a Message Waiting Indicator feature can be enabled to provide either a stutter dial tone or a flashing light on the subscriber's telephone to indicate that a voice message has been received and is ready for playback from the subscriber's mailbox.

Another means by which a subscriber can be notified of a received voice and/or fax message is through a feature known as electronic mail ("e-mail") notification. When the e-mail notification feature is enabled, the system can automatically send an e-mail message to a subscriber-specified e-mail address to notify the subscriber that a voice and/or fax message is waiting on the UVMS system. This feature is useful for subscribers who have ready access to e-mail, but who do not have a telephone with a message waiting light or who may not see that the light is flashing. This feature is also useful for subscribers who may be traveling, but who are able to access their electronic mail remotely. U.S. Pat. No. 5,675,507 describes another voice messaging system that provides this sort of electronic mail notification.

Both the UVMS system and the system described in U.S. Pat. No. 5,675,507 are capable of sending an e-mail notification in only one language. While this is not a problem for systems that are deployed in small office environments within a single country, it can be a problem for systems deployed in large telephone networks, where the subscribers are likely to speak a number of different primary languages. The present invention provides a solution to this problem.

SUMMARY OF THE INVENTION

According to a method of the present invention, when a subscriber of a messaging system receives a voice and/or fax message, an electronic mail message notifying the subscriber of the received message is composed in a language selected by the subscriber, and then sent to the subscriber's electronic mail address. A subscriber to the system can select one of a plurality of different languages in which the subscriber wishes to receive such e-mail notifications. The electronic mail address and an indication of the subscriber's selected language are contained in a subscriber database. Each subscriber can select a different one of the available languages. Such a capability is advantageous in a multiple language environment, and overcomes the problem associated with systems that are capable of generating such messages in only one language.

A messaging system incorporating the multiple language e-mail notification features of the present invention comprises a voice and/or fax messaging apparatus, the aforementioned database, means for composing an electronic mail message in any one of a plurality of different languages selected by the subscriber, and a server for sending the electronic mail message to the subscriber's electronic mail address. In the preferred embodiment, the means for composing an electronic mail message in a subscriber selected language comprises an array having a plurality of columns, wherein each column of the array contains the words of a different one of the plurality of languages from which electronic mail messages can be constructed. The means for composing further comprises program code that selects the array column corresponding to the subscriber selected language, and then composes the electronic mail message from the words in that selected column. Preferably, the array is generated from a flat file containing all of the words for each of the different languages.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

The present invention is directed to methods and apparatus embodied in a messaging system for notifying a subscriber of the messaging system that the subscriber has received a voice and/or fax message. The methods and apparatus of the present invention may take the form of program code (i.e., instructions) embodied in tangible media, such as floppy diskettes, CD-ROMs, hard drives, tapes or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 1:
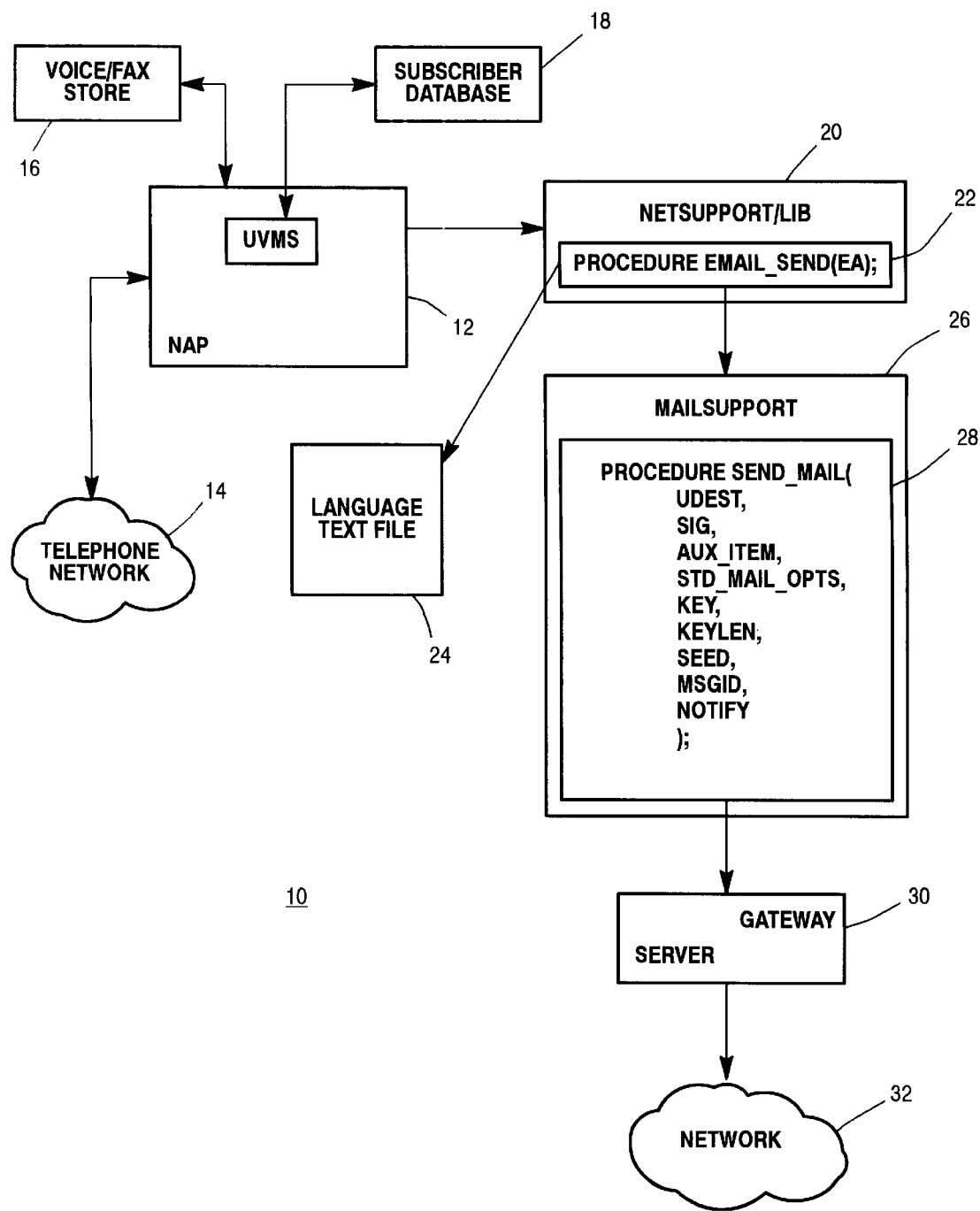
FIG. 1 shows a messaging system embodying methods and apparatus for notifying a subscriber of a received voice and/or fax message in accordance with the present invention.

Referring to the drawings, wherein like numerals represent like elements throughout, FIG. 1 shows a messaging system 10 comprising apparatus for notifying a subscriber of a received voice and/or fax message in accordance with a preferred embodiment of the present invention. Although in the preferred embodiment, the messaging system 10 is capable of receiving both voice and fax messages, the methods and apparatus of the present invention may also be used in systems that provide only voice messaging services, only fax messaging services, or other services in addition to voice and fax messaging services. The present invention is by no means limited to any one form of messaging system.

Referring to FIG. 1, the messaging system 10 of the present invention includes apparatus 12 for receiving and storing voice and/or fax messages for subscribers of the system 10 via an interface to a telephone network 14. In the present embodiment, the apparatus 12 comprises a Unisys NAP system executing the Unisys Universal Voice Message System (UVMS) network application, both of which are commercially available from Unisys Corporation, assignee of the present invention. It is understood, however, that the use of the Unisys NAP/UVMS system to provide the voice and/or fax messaging functionality of the messaging system 10 of the present invention represents only a preferred embodiment thereof, and the present invention is by no means limited to use of that particular voice/fax messaging solution. Rather, any apparatus capable of providing voice and/or fax message services may be employed in connection with the present invention.

As mentioned above, the NAP system 12 comprises a combination of hardware and software deployed on a host computer, such as a Unisys A Series or ClearPath HMP computer system. The NAP system 12 includes a storage unit 16 for storing voice and/or fax messages received by the system 12. Each subscriber to the NAP system 12 is allocated a unique "mailbox" on the system, to and from which received message are stored and retrieved. Each mailbox is identified by a unique "number," which typically is the subscriber's telephone number.

Figure 2:
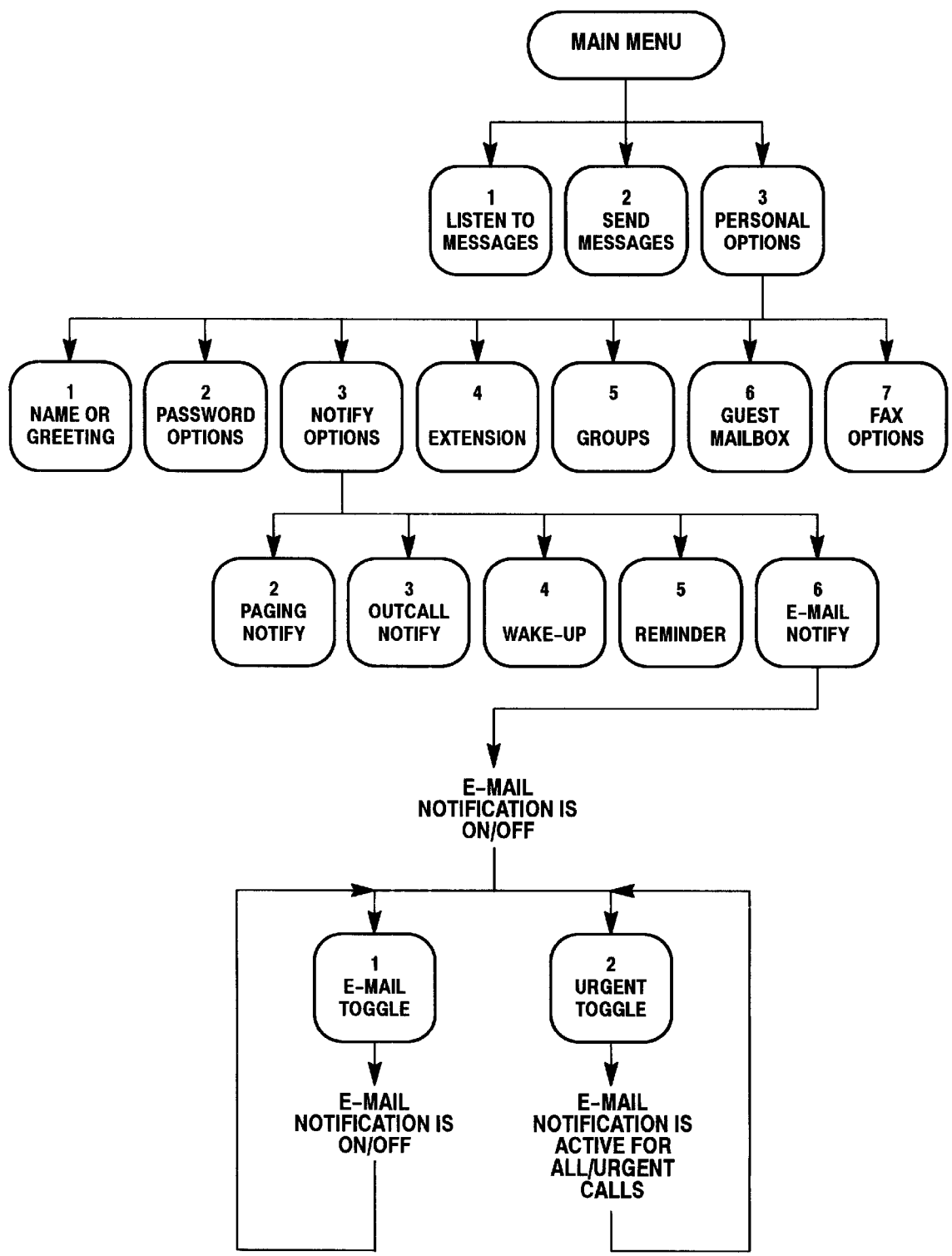
FIG. 2 is a call flow diagram illustrating the means by which a subscriber enables operation of the methods and apparatus of the present invention in the messaging system of FIG. 1.

According to the present invention, a UVMS system administrator enables the electronic mail notification features of the present invention for a given subscriber by setting EMAILNTFY=Y as one of the features in the subscriber's specified Class Of Service (COS). The subscriber can then turn the feature on and off using a Personal Options call flow in UVMS. FIG. 2 illustrates the Personal Options call flow that allows the subscriber to turn the electronic mail notification feature of the present invention, as well as other features, on and off As shown, when a subscriber first dials into the messaging system, the subscriber is presented with three choices, the third being Personal Options. The subscriber selects the Personal Options menu by pressing the number "3" on the subscriber's telephone keypad. This presents seven sub-menu choices, as shown. For purposes of enabling electronic mail notification, the subscriber selects the Notify Options sub-menu choice by again pressing the number "3" on the keypad. This presents the subscriber with five additional sub-menu choices. The E-Mail Notify choice is selected by pressing the number "6" on the subscriber's keypad. At this point, the subscriber will receive a voice prompt indicating the current state of the electronic mail notification option, i.e., either "on" or "off." The subscriber can then either press the number "1" on the keypad to toggle the state of this option, i.e., turn it on or off, or the subscriber can press the number "2" on the keypad to toggle the state of this option for Urgent calls only. If the subscriber does not wish to change the current state of the option, the subscriber can simply hang-up without pressing either key.

Referring again to FIG. 1, further according to the present invention, the voice/fax messaging apparatus 12 maintains a database 18 that provides information about each subscriber, including, for example, subscriber preferences for use of system features. Each subscriber has a respective entry in the database 18. In the case of a subscriber who is enabled to use the electronic mail notification feature of the present invention (Class of Service EMAILNTFY=Y), when the subscriber turns the feature "on" using the Personal Options call flow described above, an EMAILON flag (not shown) in the database entry for that subscriber is set to "Yes". Further according to the present invention, each subscriber entry in the database 18 contains one or more EMAILADDR fields (not shown) that each specifies an electronic mail address (provided by the subscriber) at which that subscriber is capable of receiving electronic mail messages, and a PRIM-LANG field (not shown) containing an indication of one of a plurality of different languages (e.g., American English, French, German, Dutch, etc.) in which the subscriber prefers to receive system generated messages and/or prompts, including text messages. Which different languages are available will depend on the particular system installation.

In the present embodiment, each subscriber can specify up to five different electronic mail addresses at which the subscriber wishes to receive notification messages. Each subscriber entry in the database may therefore contain up to five EMAILADDR fields—one for each electronic mail address. A notification message will then be sent to each of the specified addresses.

In the present embodiment, the system 10 implements the Simple Mail Transfer Protocol (SMTP) for electronic mail transmissions and receptions. Consequently, any electronic mail addresses provided by a subscriber and stored in the EMAILADDR field(s) of the subscriber's database entry must be valid SMTP protocol addresses. In other embodiments, the system 10 may also support the X.400 mail protocol.

In the present embodiment, each of the different languages that a subscriber may select is assigned a unique identifier. It is this identifier that is stored in the PRIM-LANG field of a subscriber database entry. Assignment of identifiers to each language is performed by the system administrator. In the present embodiment, each identifier comprises a two-character code. For example, the following identifiers could be used: AE=American English (default); DU=Dutch; SP=Spanish; FR=French; GE=German; etc. In the present embodiment, AE (American English) is the default language.

In the present embodiment, a subscriber provides the system administrator with the subscriber's electronic mail address(es) when the subscriber signs up for the notification service of the present invention. The system administrator then enters the electronic mail address(es) in the EMAIL-ADDR field(s) of the subscriber's entry in the subscriber database 18. The subscriber's selected language is set at mailbox initialization by storing the appropriate language identifier in the PRIM-LANG field of the subscriber database entry. A subscriber can change the selected language by contacting the system administrator and requesting a change. In other embodiments, either or both the electronic mail address(es) and selected language identifier could be entered and/or changed by a subscriber using a modified form of the Personal Options call flow illustrated in FIG. 2.

The messaging system 10 of the present invention further comprises means for composing an electronic mail message notifying a subscriber that the subscriber has received a voice and/or fax message. The received message will have been stored in the storage unit 16 and will be available for retrieval and/or playback by the subscriber. According to the present invention, the notification message is composed of text in the subscriber selected language identified in the PRIM-LANG field of the database entry for that subscriber. Different subscribers can select different languages.

In the present embodiment, the means for composing an electronic mail message in a subscriber selected language is implemented in software in the form of program code comprising a procedure 22 called EMAIL_SEND(),which is part of a NETSUPPORT/LIB service library 20 on the host computer system (e.g., a Unisys A Series or ClearPath HMP) on which the voice/fax messaging apparatus 12 (e.g., Unisys NAP/UVMS system) is deployed. When a subscriber receives a voice or fax message, the UVMS application calls the EMAIL_SEND() procedure 22 of the NETSUPPORT/LIB library 20. The EMAIL_SEND() procedure 22 accesses a language text file 24 containing words, in each of a plurality of different languages, from which notification messages can be composed in those different languages. Using the information in the language text file 24, the EMAIL_SEND() procedure composes a notification message for the subscriber in the language selected by the subscriber. Thus, for example, a subscriber who speaks French can select to have notification messages composed in the French language, whereas a German subscriber can select to have notification messages composed in the German language.

In greater detail, when a voice or fax message is received for a subscriber, a custom function of the UVMS application is executed that calls the EMAIL_SEND() procedure 22 and passes a parameter, EA, to the procedure 22. The EA parameter has the following fields:

| RSLT | | | LE; 02 |
|---|---|---|---|
| INFOGR | | | LE; 300 |
| ADDR | | GROUP; | |
| | EMADDR | LE; 50 | |
| | FILL | LB; 48 | |
| EG | | | | where LE stands for "length" and the number following "LE;" indicates the length of the field in bytes. The RSLT field can be used to pass result codes back to the UVMS application, such as, for example, an indication that the EMAIL_SEND() procedure 22 completed successfully. The ADDR group comprises an EMADDR field that contains an electronic mail address of the subscriber, which is retrieved from one of the EMAILADDR fields of the subscriber's entry in the subscriber database 18. A FILL field serves as a data filler to fill out the remainder of the address entry. In the case of a subscriber that has provided multiple electronic mail addresses (each of which is stored in its own EMAIL-ADDR field in the subscriber database entry), the EMAIL_SEND() procedure 22 will be called once for each of the different electronic mail addresses.

The INFOGR field is another group that contains the following sub-fields:

| INFOGR | | GROUP; | |
|---|---|---|---|
| | QSTS | | LE; 2 |
| | MLOC | | LE; 4 |
| | SMBX | | LE; 14 |
| | SEXT | | LE; 2 |
| | DT | | LE; 17 |
| | TM | | GROUP; |
| | | HH | LE; 2 |
| | | MM | LE; 2 |
| | EG; | | |
| | FXCS | | LE; 20 |
| | FXPG | | LE; 4 |
| | MSLG | | LE; 6 |
| | MSIN | | LE; 2 |
| | FILL1 | | LE; 2 |

| -continued | |
|---|---|
| DMBX | LE; 14 |
| DEXT | LE; 2 |
| SNAM | LE; 24 |
| ACCESS | LE; 4 |
| SRCGUID | LE; 16 |
| MSGT1 | LE; 12 |
| SUBT1 | LE; 6 |
| MSGT2 | LE; 12 |
| SUBT2 | LE; 6 |
| SCC | LE; 4 |
| DCC | LE; 4 |
| SESS | LE; 12 |
| UNIT | LE; 3 |
| LANG | LE; 1 |
| EG | |

The QSTS field is a queue status indicator that defines a received voice and/or fax message as either NEW or NEW URGENT. The MLOC field specifies whether the received message is a voice message or a fax message. The SMBX field specifies a source mailbox of the received message. The SEXT field specifies an extension for the source mailbox identified in the SMBX field. The DT field specifies the date the message was received by the UVMS application, and the TM group specifies the time the message was received in hours (HH) and minutes (MM). The UNIT field indicates whether the specified time in the TM group is represented in units of AM, PM, or military time (e.g. 4:30 pm is 1630 hours in the military). The FXCS field holds the telephone number from which a fax message was received. The FXPG field specifies the number of pages of a received fax. The MSLG field specifies the length of a received voice message in 100ths of a second. The MSIN field is used to indicate that a fax was received, but not completely. The FILL1 field serves as a filler for the MSIN field. The DMBX field specifies the mailbox of the subscriber who received the voice or fax message, and the DEXT field specifies an extension for that mailbox. The SNAM field specifies the name of the receiving system (e.g., UVMS). The ACCESS field is not used in the present embodiment. The SRCGUID field provides an alternate means of identifying the source mailbox, using a global unique identifier. The MSGT1 and SUBT1 fields identify the received voice/fax message in the voice/fax store 16. The MSGT2 and SUBT2 fields are used to identify a copied message in the voice/fax store 16. The SCC field specifies a country code for the source mailbox in order to support systems in which the same mailbox number is assigned to different subscribers in different countries. The DCC field specifies a country code for the destination mailbox for similar reasons. The SESS field is not used in the present embodiment.

The LANG field specifies the subscriber selected language in which the notification message is to be composed. In the present embodiment, the two-character identifier stored in the PRIM-LANG field of the subscriber's entry in the subscriber database 18 is mapped to an index value, and this index value is then passed to the EMAIL_SEND() procedure 22 in the LANG field of the EA parameter. In the present embodiment, a valid index comprises any integer between 0 and 99. Assignment of index values (0–99) to each language identifier (AE, FR, DU, SP, GE, etc.) is performed by the system administrator. Preferably, an index value of 0 is reserved for the American English language (AE), which is the default language if no language has been selected by the subscriber. Other language identifiers can therefore be assigned any index value between 1 and 99. For example, the following assignments could be used: AE=0 (default); DU=1; SP=2; FR=3; GE=4; etc.

The EMAIL_SEND() procedure 22 uses the information provided in the EA parameter to construct an electronic mail notification message in the selected language. In the present embodiment, a typical notification message in the American English language conveys the following information:

Service: Universal Voice Message System
    Message deposited in Mailbox: 6106487164
    From: 6106487002
    Date: 10/06/97, Time: 14:31 hrs
    Message Type: New
    Message Content: Voice
    Voice Message Length: 16 seconds The same message generated in the French language would have the following contents:

Service: Universal Voice Message System
    Message depose dans votre Messagerie: 6106487164
    Provenant de: 6106487002
    Date: 10/06/97, Heure: 14:31
    Type de Message: Nouveau
    Contenu de Message: Voix
    Duree du Message Vocal: 16 secondes In the present embodiment, all of the words needed to construct each part of the electronic mail message in each of the different languages are provided in the language text file 24. The language text file is a flat file having the following format:

Word 1 in Language 1/
Word 1 in Language 2/
. . .
Word 1 in Language N!
Word 2 in Language 1/
Word 2 in Language 2/
. . .
Word 2 in Language N!
. . .
Word N in Language 1/
Word N in Language 2/
. . .
Word N in Language N!

where Words 1-N are all of the words needed to construct notification messages in each of the different Languages 1-N. For example, in a system in which four different languages have been installed on the system—American English, Dutch, French and German—the flat file might have the following exemplary contents:

Copy/
Kopie/
Copie/
Kopie!
New/
Nieuw/
Nouveau/
Neu!
Voice Message/
Bericht/

-continued

| Message Vocal/ |
| --- |
| Voice Mail! |
| . . . |

In this example, the first word in the flat file is "Copy" in the American English language, followed by the three translations of that word in Dutch, French, and German, respectively. The next word in the flat file is "New" in the American English language, followed by the three translations in Dutch, French, and German, respectively, and so on.

The EMAIL_SEND() procedure 22 reads the flat file and builds an internal two-dimensional array in which each word and all of its translations are present in a single row. A given column thus contains all of the words from which an electronic mail notification message can be constructed in a given one of the available languages. Using the example above, the internal array would have the following format:

|  | Column 0 (American English) | Column 1 (Dutch) | Column 2 (French) | Column 3 (German) |
| --- | --- | --- | --- | --- |
| Row 0 (Word 1) | Copy | Kopie | Copie | Kopie |
| Row 1 (Word 2) | New | Nieuw | Nouveau | Neu |
| Row 2 (Word 3) | Voice Message | Bericht | Message Vocal | Voice Mail |

In this example, American English (AE) has been assigned an index value of 0, Dutch (DU) has been assigned an index value of 1, French (FR) has been assigned an index value of 2, and German (GE) has been assigned an index value of 3. After building the internal array, the EMAIL_SEND() procedure 22 will use the index value in the LANG field of the EA parameter as a column index into the array, and will then build a notification message using the words provided in that column. For example, if the subscriber had selected Dutch as the language in which to receive electronic mail notification messages (PRIM-LANG=DU), the LANG field of the EA parameter will contain the value, 1, which is the assigned index value for that language. Based on that selection, the EMAIL_SEND() procedure 22 will construct a notification message having the format illustrated above, using the Dutch words provided in Column 1 of the internal array (e.g., Kopie, Nieuw, Bericht, etc.).

Once created, the notification message must be sent to the electronic mail address specified in the EMADDR field of the EA parameter. In the present embodiment, the message is sent via a server 30 connected to a network 32 on which the subscriber has the electronic mail account, such as, for example, the Internet, an intranet, a local area network (LAN), or the like. As used herein and in the claims, a "server," such as server 30, is an entity that provides some type of network service, such as access to files or devices, transport or translation facilities, or the like. A server may comprise hardware and/or software. As further used herein and in the claims, the term "gateway server" means a server that connects two different environments. For example, a gateway server can be used to connect a mainframe computing environment to a network such as the Internet. A gateway server can provide access to special services, such as electronic mail. A gateway server that provides access to the Internet backbone network is commonly referred to as an Internet gateway server.

In the present embodiment, the server 30 is a gateway server that provides connectivity between the host computer on which the voice/fax messaging apparatus 12 is deployed (e.g., in the present embodiment, a Unisys A Series or ClearPath HMP computer system) and the network 32. The gateway server 30 runs a mail server program that enables electronic mail messages to be sent from the host computer of the voice/fax messaging apparatus 12 to subscribers having electronic mail accounts on the network 32 or on computers or computer systems connected to the network 32. Any commercially available gateway server product may be used to implement server 30. In the present embodiment, the gateway server comprises a workstation running a mail server program under the UNIX operating system. Suitable mail server software that may be used includes SENDMAIL version 8.0, a Mail Transfer Agent available from the University of California at Berkeley, although other mail server software can be used. It is further understood that, whereas in the present embodiment, the gateway server comprises a workstation separate from the host computer on which the voice/fax messaging functionality is implemented, in other embodiments, the gateway server functionality may be implemented on the same computer system.

In the present embodiment, wherein the host computer of the voice/fax messaging apparatus 12 is a Unisys A Series or ClearPath HMP computer system, the Unisys A Series Mail System, a software package commercially available from Unisys Corporation, is used as an interface between the EMAIL_SEND() procedure 22 of the NETSUPPORT/LIB service library 20 and the gateway server 30 connected to the network 32. More specifically, the Unisys A Series Mail System includes a MAILSUPPORT library 26 that contains a SEND_MAIL() procedure 28.

The SEND_MAIL() procedure 28 is called by the EMAIL_SEND() procedure 22. The SEND_MAIL() procedure 28 has a parameter list that includes a number of fields—UDEST, SIG, AUX_ITEM, STD_MAIL_OPTS, KEY, KEYLEN, SEED, MSGID, and NOTIFY. The EMAIL_SEND() procedure 22 supplies information only in the UDEST, SIG, AUX_ITEM and STD_MAIL_OPTS fields of the parameter list when it calls the SEND_MAIL() procedure 28. The remaining fields of the parameter list of the SEND_MAIL() procedure 28 are unused. The UDEST field comprises an array that specifies the name (in the SMTP format) of the host system that originates the notification message (e.g., user@host). This name will appear in the "FROM:" field of the notification message that the subscriber receives. The SIG field contains a hard-coded string, "Voice Mail Relay." The AUX_ITEM field comprises an array that contains, in one field, the electronic mail address to which the notification message is to be sent, and in another field, the text of the notification message as composed by the EMAIL_SEND() procedure 22. The STD_MAIL_OPTS field is used to select certain standard mail options. In the present embodiment, two options are selected, "use supplied from" and "create to." The "use supplied from" option indicates that the value to be used in the "FROM:" field of the received notification message has been supplied in the UDEST field of the parameter list. The "create to" option requests that the MAILSUPPORT library 26 resolve the subscriber electronic mail address to ensure that it is formatted correctly.

The SEND_MAIL() procedure 28 formats the information received in the parameter list and generates an outgoing mail file on the host computer in a *MAIL/OUTGOING/ directory. Another process (not shown), called SMTPGATEWAY, which is started during initialization of the A Series Mail System, then recreates the outgoing mail file with an appended date/timestamp, and names the file in accordance with the following naming convention:

*SMTP/<sender>/<date>/<time>.

SMTPGATEWAY then provides a port file interface to a TCPHOSTSERVICES system library (not shown) installed on the host computer. The TCPHOSTSERVICES system library provides an SMTP connection between the host computer and the gateway server 30. Both SMTPGATEWAY and TCPHOSTSERVICES are available from Unisys Corporation as part of a configured A Series or ClearPath HMP computer system.

The mail server software (e.g., SENDMAIL, version 8.0) running on the gateway server 30 then sends the notification message to the specified electronic mail address via the network 32. If the electronic mail address is not a valid address or is not available, then a non-delivery report will be created by the MAILSUPPORT library 26. In the present embodiment, it is the system administrator's responsibility to handle such non-delivery reports. The subscriber is not automatically notified of a non-delivery report. However, in other embodiments, the subscriber could be notified automatically. As mentioned above, in a case in which the subscriber has supplied multiple electronic mail addresses (up to a maximum of five in the present embodiment), the EMAIL_SEND() procedure 22, and also therefore the SEND_MAIL() procedure 28, is called once for each of those different addresses.

Figure 3:
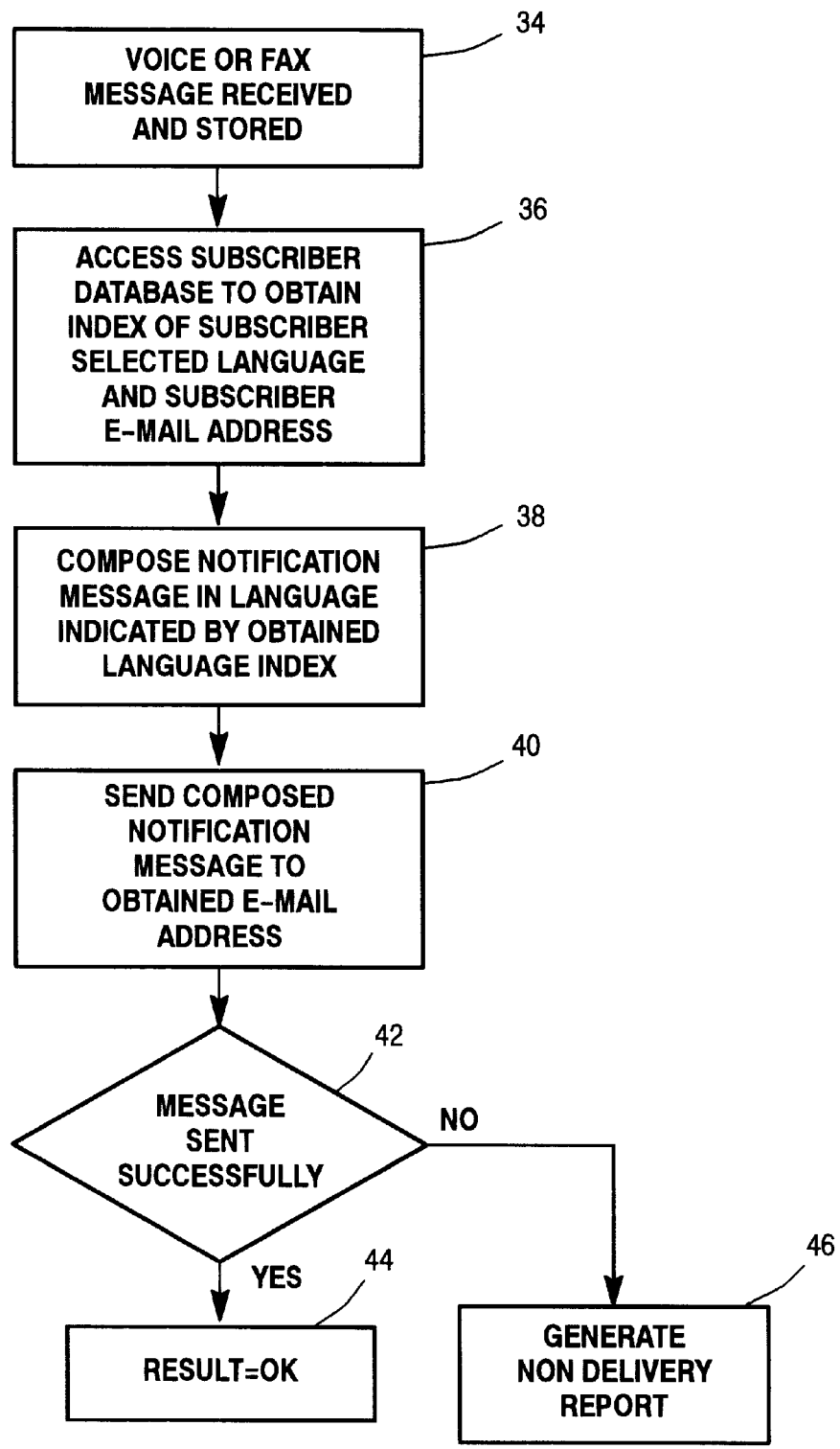
FIG. 3 is a flow diagram illustrating both the operation of the system of FIG. 1 and a preferred embodiment of a method of the present invention.

FIG. 3 is a flow diagram further illustrating the operation of the system 10 of FIG. 1 and illustrating a preferred embodiment of a method of the present invention. As shown, in step 34, the voice/fax messaging apparatus 12 receives a voice or fax message intended for a subscriber. Next, in step 36, the apparatus 12 accesses the subscriber database 18 to obtain from the subscriber's entry in the database (i) an electronic mail address provided by the subscriber, and (ii) an indication of a selected one of a plurality of different languages in which the subscriber wishes to receive notification messages via electronic mail. At step 38, a notification message is composed in the subscriber selected language notifying the subscriber that the subscriber has received a voice or fax message. In the present embodiment, this step is performed by the EMAIL_SEND() procedure 22. Next, at step 40, the notification message is sent via a network 32 to the electronic mail address obtained from the subscriber's entry in the subscriber database 18. In the present embodiment, this step is performed by the SEND_MAIL() procedure 28 and gateway server 30, which also employ the SMTPGATEWAY process (not shown) and TCPHOSTSERVICES system library (not shown), as discussed above. At step 42, the system 10 determines whether the electronic mail message was transmitted successfully. If so, the system 10 returns a result of "OK" at step 44. If not, a non-delivery report is generated at step 46. In the case of a subscriber that has supplied more than one electronic mail address, steps 38 through 46 are repeated for each of the different electronic mail addresses. In another embodiment, the composition step (e.g., step 38) could be performed just once, with only steps 40 through 46 being repeated for each of the different electronic mail addresses.

As the foregoing illustrates, the present invention is directed to methods and apparatus for notifying a subscriber of a received voice and/or fax message in a language selected by the subscriber. The methods and apparatus of the present invention may be employed in messaging systems that receive only voice mail messages, only fax messages, or both types of messages. As used in the claims, phrases such as "receiving one of a voice message and a fax message" are meant to encompass each of these possibilities. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. In a messaging system, a method comprising the steps of:

receiving one of a voice message and a fax message intended for a subscriber;

composing an electronic mail message, using words of a subscriber selected one of a plurality of different human languages, that notifies the subscriber that the subscriber has received said one message; and sending the composed electronic mail message to the subscriber.

2. The method recited in claim 1 further comprising:

accessing a database to obtain an electronic mail address of the subscriber and an indication of the subscriber selected one of said plurality of different human languages.

3. The method recited in claim 2 wherein said step of composing said electronic mail message further comprises:

providing a file containing all of the words needed to construct said electronic mail message in each of said plurality of different human languages;

building, from the words in the file, an array comprising a plurality of columns, wherein each column of the array contains the words of a different one of said plurality of human languages from which electronic mail messages can be constructed in that human language;

using said indication of the subscriber selected human language to select the column of said array corresponding to the subscriber selected human language; and composing said electronic mail message from the words in the selected column of said array.

4. The method recited in claim 3 wherein said file comprises a flat file.

5. A messaging system comprising:

means for receiving a message intended for a subscriber, said message comprising one of a voice message and a fax message;

means for composing an electronic mail message, using words of a subscriber selected one of a plurality of different human languages, that notifies the subscriber that the subscriber has received said one message; and means for sending the composed electronic mail message to the subscriber.

6. The messaging system recited in claim 5 further comprising:

means for accessing a database to obtain an electronic mail address of the subscriber and an indication of the subscriber selected one of said plurality of different human languages.

7. The messaging system recited in claim 6 wherein said means for composing said electronic mail message further comprises:

an array comprising a plurality of columns, wherein each column of the array contains the words of a different one of said plurality of human languages from which electronic mail messages can be constructed in that human language;

means for selecting the column of said array corresponding to the subscriber selected human language as indicated in said database; and means for composing said electronic mail message from the words in the selected column of said array.

8. The messaging system recited in claim 7 further comprising:

a file containing all of the words needed to construct said electronic mail message in each of said plurality of different human languages; and means for building, from the words in the file, said array.

9. In a messaging system of a type capable of receiving one of a voice message and a fax message intended for a subscriber, apparatus for notifying the subscriber that said message has been received comprising:

a database containing information that specifies an electronic mail address of the subscriber and an indication of one of a plurality of different human languages selected by the subscriber;

program code embodied on a computer readable medium that contains instructions that when executed by a computer causes the computer to compose an electronic mail message using words of the subscriber selected human language, the electronic mail message notifying the subscriber that the subscriber has received said message; and a server that sends the electronic mail message via a network to the electronic mail address specified in the database for the subscriber.

10. The messaging system recited in claim 9, further comprising an array comprising a plurality of columns, wherein each column of the array contains the words of a different one of said plurality of human languages from which electronic mail messages can be constructed in that human language.

11. The messaging system recited in claim 10, wherein said instructions of said program code further cause said computer to select the column of said array corresponding to the subscriber selected human language indicated in said database and to compose said electronic mail message from the words in the selected column.

12. The messaging system recited in claim 10 further comprising a file containing all of the words needed to construct said electronic mail message in each of said plurality of different human languages, and wherein said instructions of said program code further cause said computer to build said array from the words in said file.

13. In a messaging system of a type capable of receiving one of a voice message and a fax message intended for a subscriber, apparatus for composing an electronic mail message in one of a plurality of different human languages selected by the subscriber that notifies the subscriber that the message was received, comprising:

an array comprising a plurality of columns, wherein each column of the array contains the words of one of said plurality of different human languages from which electronic mail messages can be constructed in that human language; and program code embodied on a computer readable medium comprising instructions that when executed by a computer cause the computer to select the column of said array corresponding to the subscriber selected human language and to compose said electronic mail message from the words in the selected column of said array.

14. The apparatus recited in claim 13 further comprising a file containing all of the words needed to construct said electronic mail message in each of said plurality of different human languages, and wherein said program code further comprises instructions that cause the computer to build said array from the words in the file.

* * * * *